United States Patent [19]

Martin

[11] Patent Number: 5,695,080
[45] Date of Patent: Dec. 9, 1997

[54] WIRE SHELVING QUICK CONNECT

[76] Inventor: Eugene Z. Martin, 6150 Foreland Garth, #113, Columbia, Md. 21045

[21] Appl. No.: 427,149

[22] Filed: Apr. 24, 1995

[51] Int. Cl.[6] ........................................ A47F 5/00
[52] U.S. Cl. .................... 211/183; 211/181; 211/187; 248/243
[58] Field of Search ...................... 211/183, 181, 211/187; 248/243, 249, 250, 340, 225.21

[56] References Cited

U.S. PATENT DOCUMENTS

| | | | |
|---|---|---|---|
| 657,923 | 9/1900 | Escher | 211/183 X |
| 3,278,149 | 10/1966 | Brucker | 248/243 X |
| 3,438,344 | 4/1969 | Ferdinand et al. | 108/110 |
| 3,486,683 | 12/1969 | Kamins et al. | 248/340 X |
| 3,490,393 | 1/1970 | Nelson | 248/243 X |
| 3,598,064 | 8/1971 | Stempel | 248/249 X |
| 3,691,966 | 9/1972 | Ferdinand et al. | 108/144 |
| 3,763,793 | 10/1973 | Fleck | 108/64 |
| 4,086,858 | 5/1978 | Howitt | 211/153 X |
| 4,158,336 | 6/1979 | Brescia et al. | 108/111 |
| 4,548,327 | 10/1985 | Kilkelly | 248/250 X |
| 4,717,104 | 1/1988 | Lee | 248/249 X |
| 4,722,648 | 2/1988 | Camilleri | 248/250 X |
| 4,735,325 | 4/1988 | Remmers | 248/250 X |
| 4,783,035 | 11/1988 | Remmers | 248/250 |
| 5,185,982 | 2/1993 | Hostetler | 52/646 |
| 5,284,311 | 2/1994 | Baer | 248/243 |
| 5,326,062 | 7/1994 | Remmers | 248/250 |
| 5,456,435 | 10/1995 | Sweeney | 248/243 X |

*Primary Examiner*—Robert W. Gibson, Jr.

[57] ABSTRACT

The invention is a channel shaped body having number of hooks on the back of the channel web for engaging the support rods for wire shelving and one or more platforms for supporting the ends of support rods for transverse wire shelving. The invention is adaptable to the number of support rods utilized by the shelving.

6 Claims, 4 Drawing Sheets

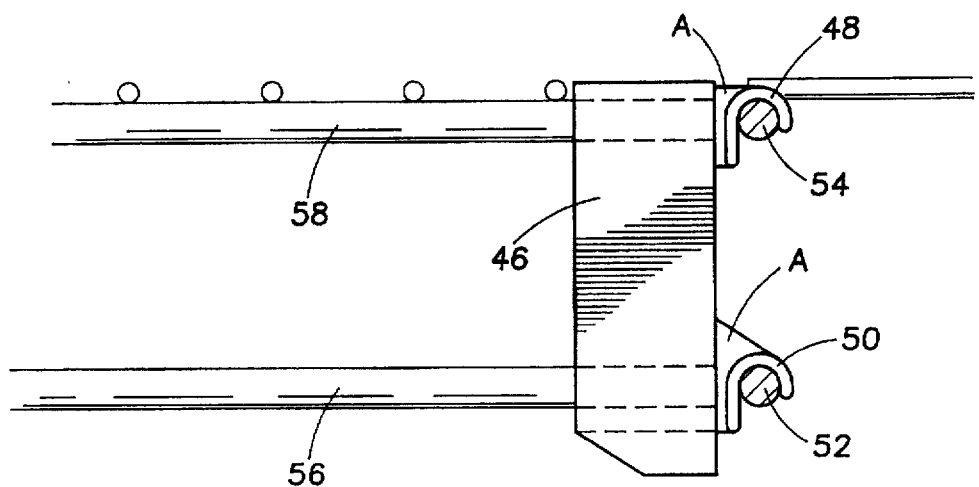
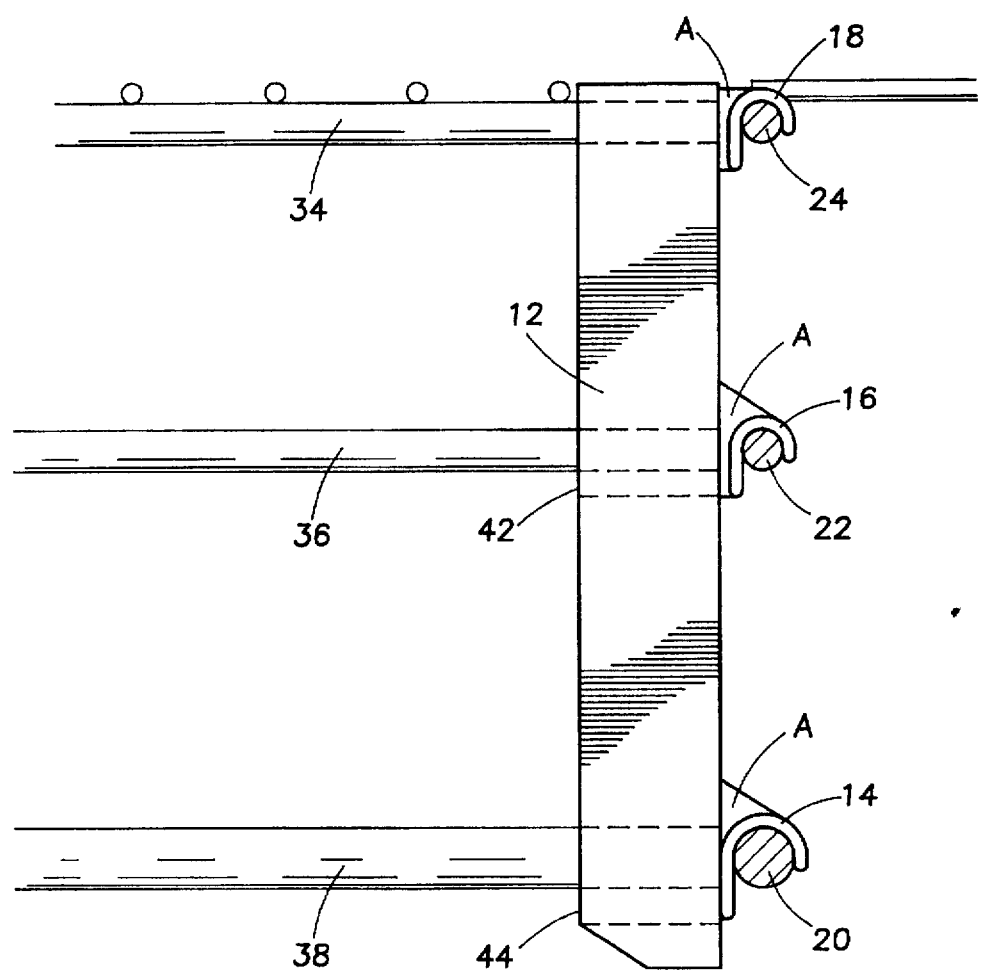

5,695,080

1

WIRE SHELVING QUICK CONNECT

BACKGROUND OF THE INVENTION

1. Field of the Invention

This invention relates generally to wire shelving and in particular to a quick and efficient means for connecting corner shelving.

2. Description of the Prior Art

Wire shelving has long been used in the institutional setting, but only of recent times has it gained popularity in domestic new construction and remodeling. Wire shelving has largely replaced wood and particle board in areas such as kitchen cabinets, bedroom closets and linen closets. As a general rule these shelves support relatively light loads and are affixed to wall studs rather than being free standing with leg support structures. The areas where domestic wire shelving is utilized are much more confined than commercial uses and as a result there tends to be more corner intersections with the attendant problems of alignment, connection and support.

There have been numerous suggestions and proposals put forth for solving the corner intersection problems, some examples of shelving connection are shown in U.S. Patents, as for example, U.S. Pat. No. 3,438,344 issued Apr. 15, 1969 to Ferdinand et al for a steel shelving unit and corner fastening means, U.S. Pat. No. 3,691,966 issued Sep. 19, 1972 to Ferdinand et al. for a corner attachment for steel shelving, U.S. Pat. No. 3,763,793 issued Oct. 9, 1973 to Fleck for a system for connecting wire shelf units end-to-end, U.S. Pat. No. 4,158,336 issued Jun. 19, 1979 to Brescia et al for a shelving system with corner clipped connectors and U.S. Pat. No. 5,185,982 issued Feb. 16, 1993 to Hostetler for a corner joint for modular assemblies.

The references cited taken alone or in combination fail to anticipate the disclosed and claimed herein.

SUMMARY OF THE INVENTION

The connector of the invention is characterized by a channel member formed from a polymeric material that includes two or more hook members on the exterior channel web that are adapted to engage the support rods on wire shelving. The interior of the channel contains one or more wall to wall platforms for receiving the support rods of shelving that lie transverse to the aforesaid support rods.

The hook members are generally "C" shaped and of a size and design that will cause the hook to grasp a circular support rod of the appropriate size. The hook is narrow enough to fit between the deck rods of the wire shelving.

The channel portion of the member is open at one end which constitutes the top end and is closed at the bottom end where one support rod rests. In the shelf is constructed with two support rods the similar transverse shelf is supported at the junction by the bottom support rod alone. Where the shelf is formed with three support rods there is a second platform intermediate the top and bottom of the channel which supports a second support rod. The top of the channel remains open.

Since the connector is formed from a polymeric material it may be molded in any color to coordinate with the wire shelving which it supports.

It is therefore an object of the invention to provide a new and improved quick connector for wire shelving.

It is another object of the invention to provide a new and improved quick connector for wire shelving that has all the advantages of prior art shelf connectors and none of the disadvantages.

2

It is a further object of the invention to provide a new and improved quick connector for wire shelving that may be easily and efficiently manufactured and marketed.

It is still another object of the invention to provide a new and improved quick connector for wire shelving that is of durable and reliable construction.

It is still a further object of the invention to provide a new and improved quick connector for wire shelving that is adaptable to various size and dimensional shelving.

It is another object of the invention to provide a new and improved quick connector for wire shelving that is susceptible of low cost of manufacture and accordingly susceptible of low prices of sale to the consuming public.

These, together with other objects of the invention, along with the various features of novelty which characterize the invention, are pointed out with particularly in the claims annexed to and forming a part of this disclosure. For a better understanding of the invention, its operation advantages and the specific objects attained by its uses, reference should by had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side elevation view of the invention engaged with two support rails.

FIG. 6 Is a side elevation view of the invention engaged with three support rails.

DETAILED DESCRIPTION OF A PREFERRED EMBODIMENT

Figure 1:
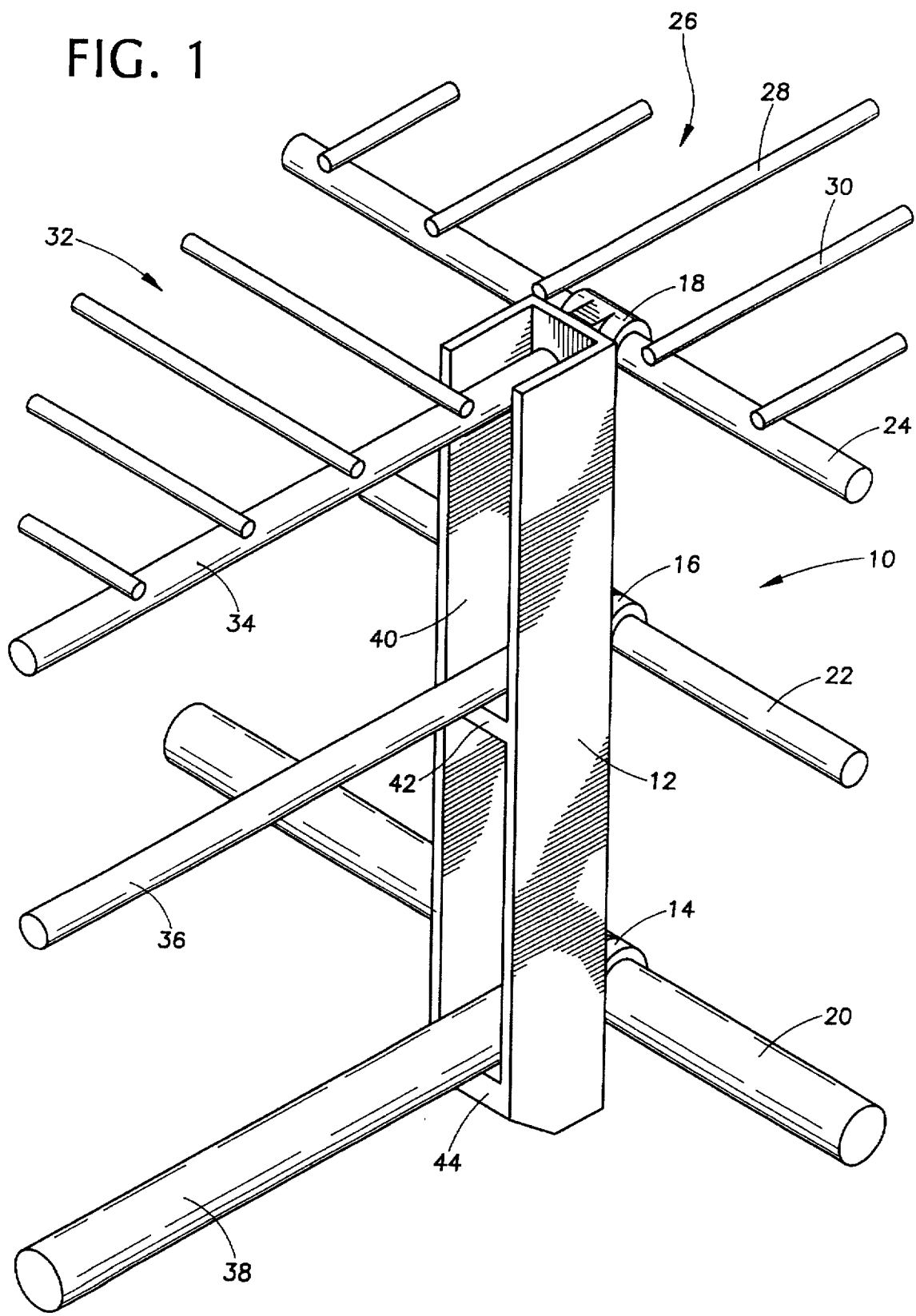
FIG. 1 is a perspective view of a three support rod connector of the invention.

Referring now to FIG. 1, the invention is shown generally at 10, a channel shaped member 12 forms the body of the connector and includes three C-shaped hooks 14, 16 and 18 that form part of the exterior side of the channel web. The body is formed from a rigid, impact resistant plastic material and the hooks are intended to be molded as part of the body member. The hooks engage three support rods, 20, 22 and 24 on the wire shelving shown generally at 26. The top hook 18 is sized to fit between the shelf deck rods 28 and 30. The transverse shelf shown generally at 32 includes three support rods 34, 36 and 38 which terminate in the channel 40 of the body 12. Support 34 stands free in the channel while support 36 rests on platform 42 and support 38 on platform 44.

Figure 2:
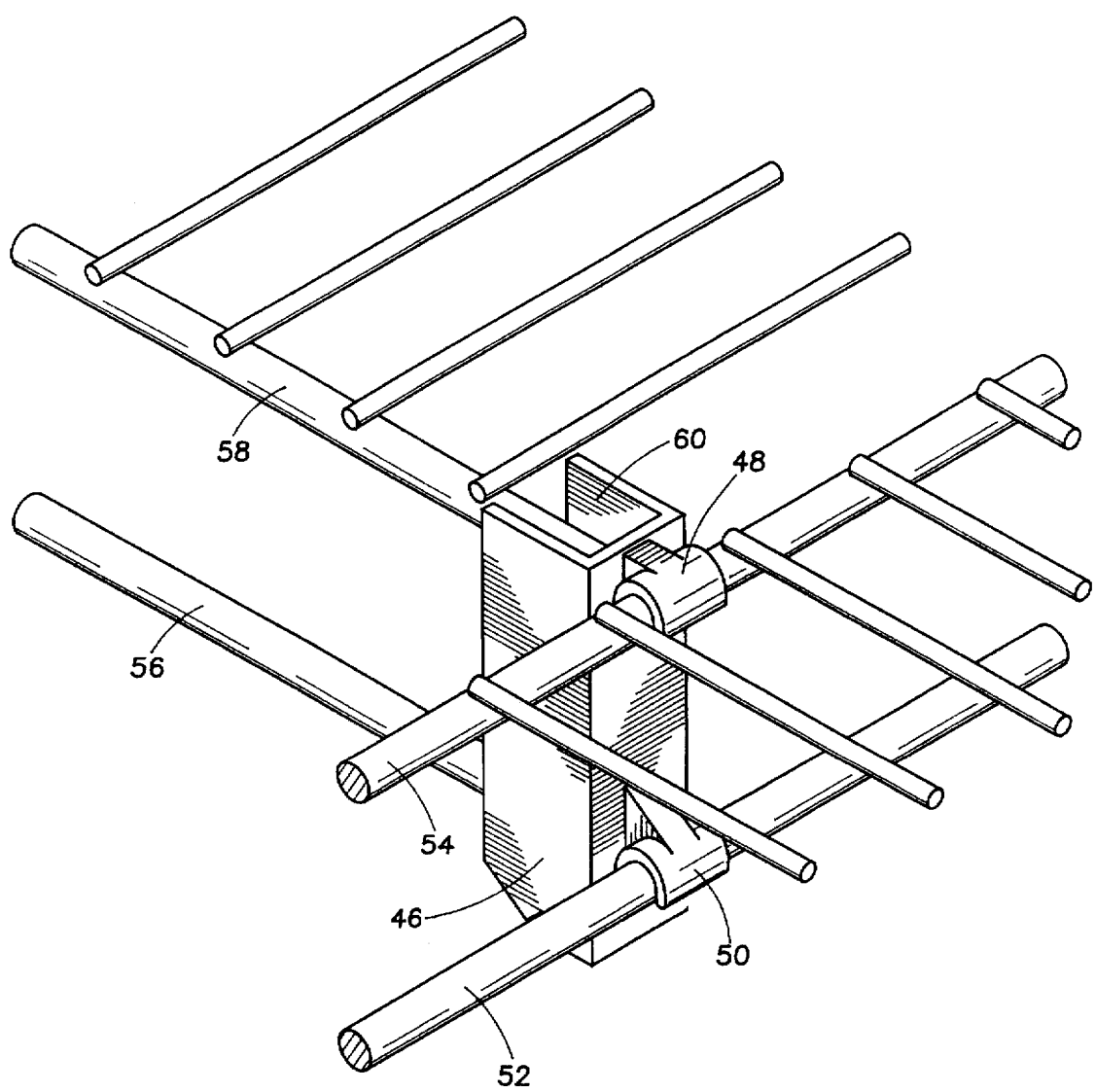
FIG. 2 is a perspective view of a two support rod connector of the invention.

FIG. 2 shows a connector body 46 including hooks 48 and 50 which engage a shelf with two support rods 52 and 54. A transverse shelf includes support rods 56 and 58 which rest in the channel 60 of the body 46.

Figure 3A:
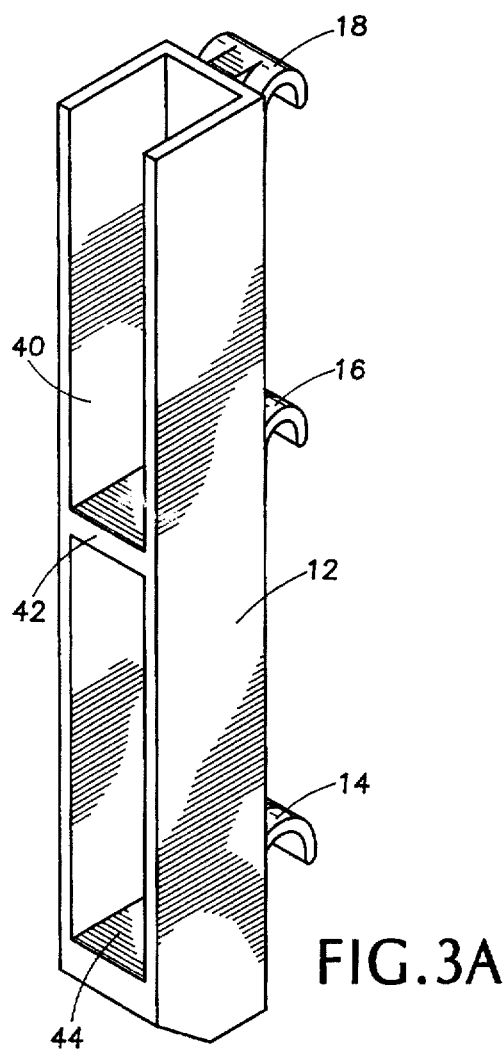
FIGS. 3A and 3B are rotated perspective views of the three support rod connector.
Figure 3B:
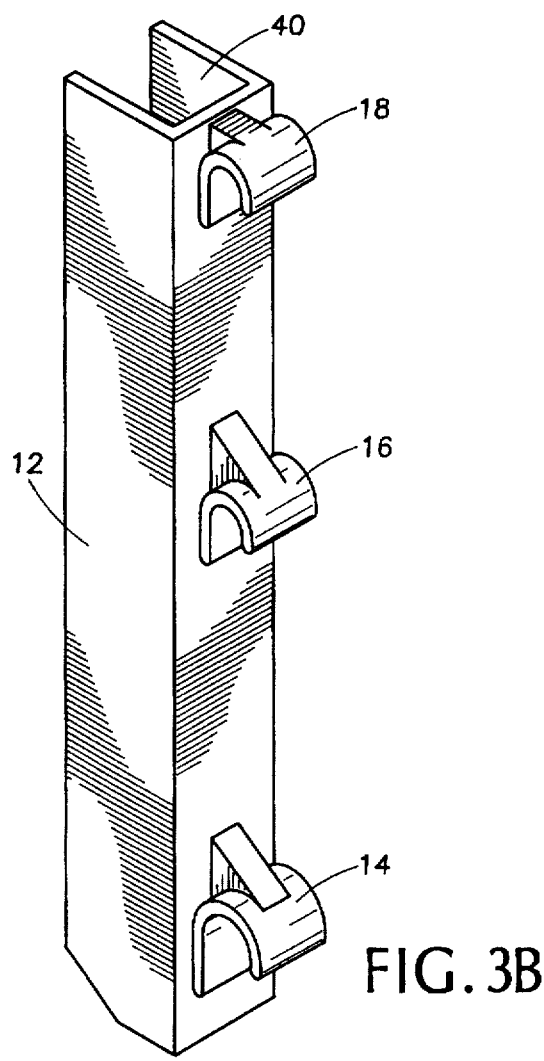

FIG. 3A and 3B show a connector with out the shelving to which it is attached in practice. The molded plastic body 12 contains a channel 40 which includes two platforms 42, 44 for supporting the shelf support rods. The exterior of the channel web 62 contains three C shaped hooks, 14, 16, 18 that are designed and sized to engage the shelf support rods.

Figure 4A:
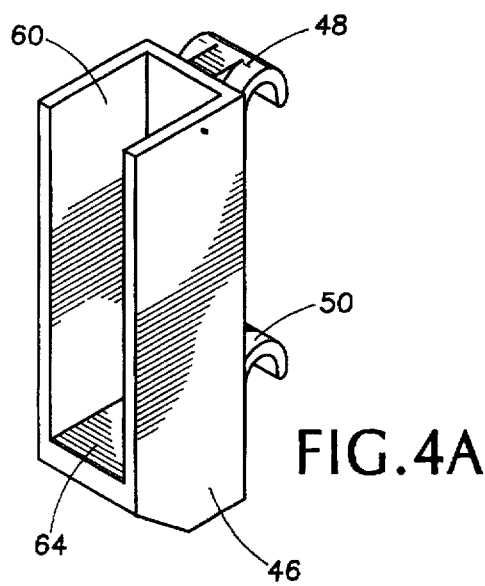
FIGS. 4A and 4B are rotated perspective views of the two support rod connector.
Figure 4B:
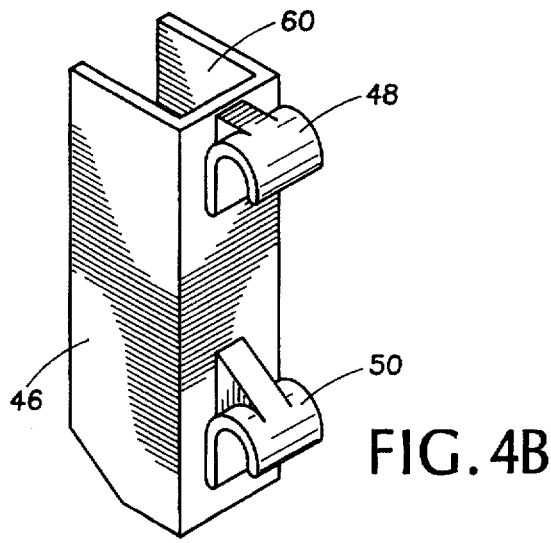

FIGS. 4A and 4B show a connector for use with shelving having two support rods. The top of channel 60 is open and the bottom is closed by support platform 64 in which rests the support rod for the transverse shelf. The open top to the channel facilitates the assembly of the shelving and is not found to have any negative effects as far as the structural integrity of the connection system.

FIGS. 5 and 6 show another view of the connectors and in particular the hook engagement of the support rods. The hooks 14, 16, 18, and 48, 50 are designed to engage and grasp the support rod in a friction fit that tends to be more secure than a loose fit which depend upon the weight of the shelf and its contents to cause the connector to remain in place. In addition each connector includes, in the molding, a reinforced section 'A' that permits the hook to withstand the forces cause by overloading of the metal shelves.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A connector for wire shelving having support rods, said connector comprising:

a channel shaped body including a first wall; and a second wall positioned in a spaced parallel relation;

a web joining said first and said second wall;

at least one platform connecting each wall and the web at one end of the body;

at least one the platform means connecting each wall and the web intermediate the ends of the body.

said platform means adapted to receive a wire shelf support member;

a plurality of hook means extending from the web adapted and spaced to engage the support rods of the wire shelving;

the hook means extend from the web in a direction opposed to the channel;

meaning for reinforcing the hook means positioned between the hook and the body.

2. The connector for wire shelving according to claim 1 wherein the body is formed of molded polymeric material.

3. The connector for wire shelving according to claim 1 two of said hook means.

4. The connector for wire shelving according to claim 1 including three of said hook means.

5. The connector for wire shelving according to claim 1 wherein each hook means is C-shaped in cross section.

6. The connector for wire shelving according to claim 1 wherein each hook is sized to engage the wire support rods by a friction fit.

* * * * *